Patented Oct. 7, 1930

1,777,757

UNITED STATES PATENT OFFICE

WALTER A. MANSS, OF WILMINGTON, DELAWARE, ASSIGNOR TO E. I. DU PONT DE NEMOURS & COMPANY, OF WILMINGTON, DELAWARE, A CORPORATION OF DELAWARE

INDOPHENOL INTERMEDIATE AND BLUE SULPHUR DYE DERIVED THEREFROM

No Drawing.   Application filed October 27, 1925.   Serial No. 65,242.

This invention relates to a method of preparing a sulphur blue dye and comprises preparing an indophenol at a temperature below 0° C., and subsequently thionating the indophenol.

It is well known in the art that an indophenol is produced by condensing p-nitrosophenol with diphenylamine in a sulphuric acid medium. According to the usual method the diphenylamine is dissolved in 75% sulphuric acid and the solution cooled to about 20° C. and to this is added the solution of p-nitrosophenol in 75% acid so that the temperature does not rise above about 25° C. The indophenol solution is then poured into ice water and the precipitated indophenol is filtered off and washed with water to free it from excess acid. The indophenol so obtained is quite impure and contains a large proportion of by-products which interfere materially in the preparation of the sulphur blue dyes by thionation of the indophenol. Because of the contained impurities, the thionation is not complete and the resulting dye is of a red shade and is of poor tinctorial strength.

It is one of the objects of my invention to prepare indophenols which are particularly adapted for the prepartion of sulphur blue dyes by thionation because of their great purity.

Another of the objects of my invention is the manufacture of dyes from these pure indophenols by a method especially advantageous for these particular compounds, in that the yield and quality of the dyes are greatly improved. The purity of the indophenol is reflected in the quality of sulphur dye which, when derived from it by the present method, is practically completely soluble in the sodium sulfide bath.

The characteristic features of my new indophenol process are in the low condensation temperature employed, viz., about −2° C. and in the time consumed in the condensation and precipitation of the indophenol. The time is of importance because this indophenol is unstable in acid solution. To decrease the time required for the condensation, a weaker acid, viz 67%–70%, is employed which permits of a reaction at a low initial temperature of about −20° C. to which one of the component solutions is cooled. According to the method of carrying out the condensation, the greater part of the reaction takes place at temperatures substantially below −2° C. To prevent decomposition during the precipitation and subsequent treatment of the indophenol, speed is required in freeing the product from the acid. Finally, it has been found advantageous to completely remove all adhering acid by neutralizing the indophenol paste with a dilute alkaline solution or to form the stable leuco indophenol by treating the acid indophenol paste with sodium sulfide in a neutral or slightly acid solution.

An indophenol, to which my thionation process is particularly applicable, may be prepared, for example, as follows:

One part of diphenylamine is dissolved in 3.2 parts of 93% sulphuric acid at 40–50° C. and cooled to about −5° C. At the same time 0.755 part of p-nitrosophenol is dissolved in 12.55 parts of 64% sulphuric acid at about 0° C. and cooled to −20° C. The diphenylamine solution is then run into the nitrosophenol solution as rapidly as possible at a temperature below 0° C. external cooling being required during the addition. The indophenol solution is then stirred for about 10 minutes and is run into 75 parts of a mixture of ice and water below 5° C. The indophenol is filtered off and washed free from the bulk of the acid. The acid press-cake is then stirred in a solution of 1.0 part of soda ash in 60 parts of water until the mixture is uniform. The neutralized press cake is then filtered and thoroughly washed and dried at about 50° C. When tested for purity, the indophenol is completely soluble in ethyl alcohol and also in an alcoholic polysulfide solution.

Technically, it is often advantageous to isolate the indophenol in the more stable leuco form. To accomplish this, the acid press cake is treated with sodium sulfide in a neutral or slightly acid solution, in place of the neutralization with the soda ash solution treatment. The leuco-indophenol is then filtered, thoroughly washed and dried at about 50° C.

The above mentioned amounts of materials and strengths of acid can, of course, be varied within certain limits. Since the sulphuric acid used in this process is a condensing medium which serves to dissolve the initial intermediates and to absorb the water formed in the reaction, the amount of acid employed can be varied considerably without affecting the product. The lower limit probably would be dependent only upon the amount of acid necessary for dissolving the initial materials. The upper limit to the amount used can be extended indefinitely but, of course, it would be economically unwise to use more than is absolutely necessary to maintain the proper solution and necessary regulation of temperature. The initial strength of the acid employed prior to any reaction taking place could be conveniently varied from about 65 to 71%. If desired, the amount of p-nitrosophenol can be increased from 3 to 5%, suitable changes being made in the amount of diphenylamine used. The amount of soda ash can be increased 100% or more if desired.

Several methods have been suggested for converting indophenol or leuco indophenol into dyes. One method for producing the color is that in which the indophenolic bodies are heated with an alcoholic sodium tetrasulfide solution under high pressures. Another process is that which consists of heating the indophenol with a solution of sodium pentasulfide in alcohol under reflux. To obtain the color, the alcohol is distilled off, the residue is dissolved in water, and after filtration the dye is precipitated from the filtrate by oxidation. The dyes made by the usual processes, however, are generally unsuitable for use on the various types of dyeing machines without the use of some purification process.

By carrying out the preparation of the indophenol according to the process described above, and by thionating and purifying the dye according to my improved process, as described below, the yield and quality of the resulting dye are markedly improved. This dye, prepared according to my process, is characterized by being a more completely thionated product, and by being practically free from the partially thionated indophenol, which constituent is of redder shade and of poorer strength. In order to completely thionate the indophenol, it may be mixed with sodium sulphide, alcohol and sulphur, and the mixture boiled, using high steam pressures in the heating element and very efficient agitation. It is also advantageous to use a large excess of a polysulfide containing a high percentage of sulphur, for example, $Na_2S_8$.

To render the dye practically free from partially thionated indophenolic constituents, a sufficient quantity of an alkaline hydroxide is added to the melt prior to the distillation of the alcohol to reduce the polysulfide to a tri- or tetra-sulfide in which solution the more highly thionated product is insoluble and from which it can be filtered off.

It has been found that this dye possesses the property of losing tinctorial strength and of decomposing to form a material which is insoluble in dilute sodium sulfide, upon drying or upon long standing. By making the purified dye paste slightly acid by the addition of a weak acid and a solution of a salt having acidic properties, such as sodium bisulfate, these harmful properties can be corrected.

The following is a convenient and preferred process for preparing the sulphur blue dye from the indophenol:

One part of the above mentioned indophenol or leuco-indophenol is added to a solution of 2.85 parts of fused sodium sulfide and 4.5 parts of sulphur in 7.5 parts of alcohol. The mixture is boiled vigorously in a suitable kettle with a jacket temperature of 135°–145° C. and with very efficient stirring until the thionation is complete, the time required being from 90 to 130 hours. A solution of 0.9 part of caustic soda in 3.5 parts of water is added and, after the alcohol is distilled off, the dye mixture is diluted further and filtered. The dye paste is first washed with a dilute salt solution and later with water. It is then neutralized with a 20% solution of sulphuric acid and treated with 0.1 part of sodium bisulfate.

The amounts of materials used can be varied within certain limits depending upon the conditions of operation. The temperatures and time may suitably be varied to conform with the product desired.

Any suitable salt having acidic properties may be used in place of the sodium bisulfate.

As a criterion of purity and quality, a dyeing shows this color to be considerably greener and brighter, and much stronger than any commercial product made from those intermediates. This sulphur blue dye is practically completely soluble in dilute sodium sulfide solution of such strength as is used in dyeing. If a little sodium hydrosulfite is added to this solution, a clear light yellow vat dye is obtained. This new dye also can be used on the various types of dyeing machines without further purification.

I claim:

1. The process of making a blue sulphur dye which comprises forming an indophenol from p-nitrosophenol and diphenylamine by condensation at a temperature below 0° C. and thionating the indophenol so formed.

2. The process of making a blue sulphur dye, which comprises forming an indophenol from p-nitrosophenol and diphenylamine by condensation at a temperature below 0° C., thionating the indophenol and treating the thionated product with caustic alkali.

3. The process of making a blue sulphur dye from an indophenol obtained by condensing p-nitrosophenol and diphenylamine at a temperature below 0° C. which comprises boiling a mixture of said indophenol, alcohol, a soluble polysulfide and sulphur, adding caustic alkali to the boiled mixture, separating and washing the dye.

4. The process of making a blue sulphur dye which comprises forming an indophenol from p-nitrosophenol and diphenlyamine by condensation at a temperature below 0° C., thionating the indophenol so formed, treating the thionated product with caustic alkali, filtering, and acidifying the alkaline filter cake.

5. The process of making a blue sulphur dye from an indophenol obtained by the condensation of diphenylamine and p-nitrosophenol at a temperature below 0° C. which comprises boiling a mixture of the indophenol, alcohol and a soluble sulfide containing a high percentage of sulphur, adding caustic alkali to the boiled mixture, distilling off the alcohol, diluting the residue with water, filtering off the dye and washing the dye.

6. The process of making a blue sulphur dye from an indophenol obtained by the condensation of diphenylamine and p-nitrosophenol at a temperature below 0° C. which comprises boiling a mixture of the indophenol, alcohol, sodium sulfide and sulphur, adding caustic alkali to the boiled mixture, distilling off the alcohol, diluting the residue, filtering off the dye, washing the dye, slightly acidifying the purified dye paste and treating the acid paste with a salt having acidic properties.

7. A sulphur blue dye suitable for machine dyeing, obtainable by treating a thionated indophenol, said indophenol being formed by the condensation of p-nitrosophenol and diphenylamine below 0° C., with caustic alkali and water to precipitate the dye, said dye being completely soluble in sodium sulfide solutions.

8. A blue sulphur dye suitable for machine dyeing, obtainable by treating a thionated indophenol, said indophenol being formed by the condensation of p-nitrosophenol and diphenylamine below 0° C., with caustic alkali and water to precipitate the dye, the dye then being acidified slightly and treated with an acid salt, said dye being completely soluble in sodium sulfide solutions and yielding a clear light yellow vat.

9. A blue sulphur dye obtained by thionating the product formed by the condensation of p-nitrosophenol and diphenylamine at a temperature below 0° C., the dye being characterized by being substantially completely soluble in a dilute sodium sulfide solution and yielding a clear light yellow vat upon treatment with sodium hydrosulfite.

10. In a process of making a blue sulphur dye from indophenol, the step which comprises condensing p-nitrosophenol and diphenylamine, the condensation being carried out at a temperature below 0° C.

11. In a process of making a blue sulphur dye from indophenol, by condensation the step which comprises mixing, in the presence of sulphuric acid, diphenylamine at a temperature of about $-5°$ C. with p-nitrosophenol at a temperature of about $-20°$ C. and maintaining the mixture at a temperature below 0° C.

12. In a process of making a blue sulphur dye from indophenol, the step which comprises condensing diphenylamine with p-nitrosophenol at a temperature below 0° C., drowning the condensation product in water at a temperature below 5° C. to form a precipitate, and filtering, washing and neutralizing the precipitate.

13. In a process of making a blue sulphur dye from indophenol, the step which comprises condensing diphenylamine with p-nitrosophenol at a temperature below 0° C., drowning the condensation product in water at a temperature below 5° C. to form a precipitate, filtering and washing the precipitated material and treating the precipitate with substantially neutral sodium sulphide.

14. A textile fabric dyed with the compound set forth in claim 8.

In testimony whereof I affix my signature.

WALTER A. MANSS.